US008353854B2

(12) United States Patent
Horst et al.

(10) Patent No.: US 8,353,854 B2
(45) Date of Patent: Jan. 15, 2013

(54) METHOD AND DEVICES FOR MOVING A BODY JOINT

(75) Inventors: Robert W. Horst, San Jose, CA (US); Kern Bhugra, San Jose, CA (US)

(73) Assignee: Tibion Corporation, Sunnyvale, CA (US)

( * ) Notice: Subject to any disclaimer, the term of this patent is extended or adjusted under 35 U.S.C. 154(b) by 1145 days.

(21) Appl. No.: 11/932,799

(22) Filed: Oct. 31, 2007

(65) Prior Publication Data

US 2008/0195005 A1 Aug. 14, 2008

Related U.S. Application Data

(60) Provisional application No. 60/901,614, filed on Feb. 14, 2007.

(51) Int. Cl.
*A61H 7/00* (2006.01)
*H02P 1/00* (2006.01)

(52) U.S. Cl. .............. 601/33; 601/23; 601/27; 318/552; 318/139

(58) Field of Classification Search .................. 601/1, 5, 601/23, 27, 29–35, 40, 84, 89, 90, 93, 97, 601/104; 318/9, 14, 542, 546, 552, 139; 602/27–29, 65, 66
See application file for complete search history.

(56) References Cited

U.S. PATENT DOCUMENTS 1,286,482 A 12/1918 Yoder
1,366,904 A 2/1921 Davis
1,391,290 A 9/1921 Welffens
1,513,473 A 10/1924 Ackerman
1,739,053 A 12/1929 Wilhelm
1,847,720 A 3/1932 Marcellis
2,169,813 A 8/1939 Parkin
3,059,490 A 10/1962 McDuffie
3,200,666 A 8/1965 Schrodt et al.
3,358,678 A 12/1967 Kultsar
3,398,248 A 8/1968 Klauss et al.
3,402,942 A 9/1968 Shimano et al.
3,631,542 A 1/1972 Potter
3,641,843 A 2/1972 Lemmens
3,863,512 A 2/1975 Crawley
3,899,383 A 8/1975 Schultz et al.
3,925,131 A 12/1975 Krause
3,976,057 A 8/1976 Barclay
4,474,176 A * 10/1984 Farris et al. ..................... 601/27

(Continued)

FOREIGN PATENT DOCUMENTS

EP 1138286 A2 10/2001

(Continued)

OTHER PUBLICATIONS

Smith et al., U.S. Appl. No. 12/471,299 entitled "Therapy and mobility assistance system," filed May 22, 2009.

(Continued)

*Primary Examiner* — Justine Yu
*Assistant Examiner* — LaToya M Louis
(74) *Attorney, Agent, or Firm* — Shay Glenn, LLP

(57) ABSTRACT

Portable devices and methods for preventing deep vein thrombosis (DVT) by assuring that the ankle is flexed and extended sufficiently to promote blood flow in the lower leg are disclosed. The device includes an actuator with a free movement mode that allows a patient to move freely between activations or to initiate movement to delay a next automatic activation.

9 Claims, 6 Drawing Sheets

SINGLE MOTOR ACTUATOR

ACTUATOR AND ANKLE ATTACHMENT

U.S. PATENT DOCUMENTS 4,507,104 A 3/1985 Clark et al.
4,538,595 A * 9/1985 Hajianpour ..................... 601/33
4,549,555 A 10/1985 Fraser et al.
4,588,040 A 5/1986 Albright, Jr. et al.
4,649,488 A 3/1987 Osanai et al.
4,678,354 A 7/1987 Olsen
4,679,548 A * 7/1987 Pecheux ......................... 601/40
4,691,694 A 9/1987 Boyd et al.
4,697,808 A 10/1987 Larson et al.
4,731,044 A 3/1988 Mott
4,745,930 A 5/1988 Confer
4,754,185 A 6/1988 Gabriel et al.
4,796,631 A 1/1989 Grigoryev
4,801,138 A 1/1989 Airy et al.
4,807,874 A 2/1989 Little
4,872,665 A 10/1989 Chareire
4,878,663 A 11/1989 Luquette
4,883,445 A 11/1989 Gomoll et al.
4,922,925 A 5/1990 Crandall et al.
4,934,694 A 6/1990 McIntosh
4,944,713 A 7/1990 Salerno
4,953,543 A 9/1990 Grim et al.
4,981,116 A 1/1991 Trinquard
4,983,146 A 1/1991 Charles et al.
5,020,790 A 6/1991 Beard et al.
5,052,681 A 10/1991 Williams
5,078,152 A 1/1992 Bond et al.
5,117,814 A 6/1992 Luttrell et al.
5,170,776 A * 12/1992 Pecheux ......................... 601/29
5,170,777 A 12/1992 Reddy et al.
5,195,617 A 3/1993 Clemens
5,203,321 A 4/1993 Donovan et al.
5,209,223 A 5/1993 McGorry et al.
5,213,094 A 5/1993 Bonutti
5,239,222 A 8/1993 Higuchi et al.
5,241,952 A 9/1993 Ortiz
5,282,460 A 2/1994 Boldt
5,303,716 A 4/1994 Mason et al.
5,313,968 A 5/1994 Logan et al.
5,345,834 A 9/1994 Hayashi
5,358,468 A 10/1994 Longo et al.
5,378,954 A 1/1995 Higuchi et al.
5,395,303 A * 3/1995 Bonutti et al. .................. 602/16
5,421,798 A 6/1995 Bond et al.
5,440,945 A 8/1995 Penn
5,448,124 A 9/1995 Higuchi et al.
5,463,526 A 10/1995 Mundt
5,476,441 A 12/1995 Durfee et al.
5,509,894 A 4/1996 Mason et al.
5,520,627 A 5/1996 Malewicz
5,525,642 A 6/1996 Cipriano et al.
5,534,740 A 7/1996 Higuchi et al.
5,541,465 A 7/1996 Higuchi et al.
5,582,579 A 12/1996 Chism et al.
5,585,683 A 12/1996 Higuchi et al.
5,624,390 A 4/1997 Van Dyne
5,653,680 A 8/1997 Cruz
5,662,594 A 9/1997 Rosenblatt
5,662,693 A 9/1997 Johnson et al.
5,674,262 A 10/1997 Tumey
5,683,351 A 11/1997 Kaiser et al.
5,704,440 A 1/1998 Urban et al.
5,708,319 A 1/1998 Ban et al.
5,728,017 A 3/1998 Bellio et al.
5,746,684 A 5/1998 Jordan
5,746,704 A 5/1998 Schenck et al.
5,755,303 A 5/1998 Yamamoto et al.
5,789,843 A 8/1998 Higuchi et al.
5,833,257 A 11/1998 Kohlheb et al.
5,865,770 A 2/1999 Schectman
5,916,689 A 6/1999 Collins et al.
5,931,756 A 8/1999 Ohsono et al.
5,976,063 A 11/1999 Joutras et al.
6,001,075 A 12/1999 Clemens et al.
6,033,330 A 3/2000 Wong et al.
6,062,096 A 5/2000 Lester
6,119,539 A 9/2000 Papanicolaou
6,146,341 A * 11/2000 Sato et al. ....................... 601/23
6,149,612 A 11/2000 Schnapp et al.
6,162,189 A 12/2000 Girone et al.
6,183,431 B1 2/2001 Gach, Jr.
6,217,532 B1 4/2001 Blanchard et al.
6,221,032 B1 4/2001 Blanchard et al.
6,290,662 B1 9/2001 Morris et al.
6,314,835 B1 11/2001 Lascelles et al.
6,440,093 B1 8/2002 McEwen et al.
6,472,795 B2 10/2002 Hirose et al.
6,494,798 B1 12/2002 Onogi
6,500,138 B1 12/2002 Irby et al.
6,517,503 B1 2/2003 Naft et al.
6,525,446 B1 2/2003 Yasuda et al.
6,527,671 B2 3/2003 Paalasmaa et al.
6,533,742 B1 3/2003 Gach, Jr.
6,537,175 B1 3/2003 Blood
6,554,773 B1 4/2003 Nissila et al.
6,572,558 B2 6/2003 Masakov et al.
6,599,255 B2 7/2003 Zhang
6,659,910 B2 12/2003 Gu et al.
6,666,796 B1 12/2003 MacCready, Jr.
6,689,075 B2 2/2004 West
6,694,833 B2 2/2004 Hoehn et al.
6,709,411 B1 3/2004 Olinger
6,796,926 B2 9/2004 Reinkensmeyer et al.
6,805,677 B2 10/2004 Simmons
6,821,262 B1 11/2004 Muse et al.
6,827,579 B2 12/2004 Burdea et al.
6,836,744 B1 12/2004 Asphahani et al.
6,872,187 B1 3/2005 Stark et al.
6,878,122 B2 4/2005 Cordo
6,936,994 B1 8/2005 Gimlan
6,966,882 B2 11/2005 Horst
7,041,069 B2 5/2006 West
7,124,321 B2 10/2006 Garnett et al.
7,137,938 B2 11/2006 Gottlieb
7,171,331 B2 1/2007 Vock et al.
7,190,141 B1 3/2007 Ashrafiuon et al.
7,192,401 B2 3/2007 Saalasti et al.
7,239,065 B2 7/2007 Horst
7,252,644 B2 8/2007 Dewald et al.
7,309,320 B2 * 12/2007 Schmehl ......................... 601/31
7,324,841 B2 1/2008 Reho et al.
7,365,463 B2 4/2008 Horst et al.
7,410,471 B1 8/2008 Campbell et al.
7,416,537 B1 8/2008 Stark et al.
7,458,922 B2 * 12/2008 Pisciottano ................... 482/142
7,537,573 B2 5/2009 Horst
7,559,909 B2 7/2009 Katoh et al.
7,578,799 B2 8/2009 Thorsteinsson et al.
7,648,436 B2 1/2010 Horst et al.
7,731,670 B2 6/2010 Aguirre-Ollinger et al.
7,833,178 B2 * 11/2010 Lee et al. ........................ 601/29
7,880,345 B2 2/2011 Hoffmann et al.
7,998,092 B2 8/2011 Avni et al.
2001/0029343 A1 10/2001 Seto et al.
2002/0128552 A1 9/2002 Nowlin et al.
2003/0104886 A1 6/2003 Gajewski
2003/0120183 A1 6/2003 Simmons
2003/0195638 A1 10/2003 Kajitani et al.
2003/0212356 A1 11/2003 Scorvo
2004/0015112 A1 1/2004 Salutterback et al.
2004/0049139 A1 3/2004 Craciunescu
2004/0054311 A1 3/2004 Sterling
2004/0078091 A1 4/2004 Elkins
2004/0106881 A1 6/2004 McBean et al.
2005/0014600 A1 1/2005 Clauson
2005/0085346 A1 4/2005 Johnson
2005/0085353 A1 4/2005 Johnson
2005/0101887 A1 5/2005 Stark et al.
2005/0151420 A1 7/2005 Crombez et al.
2005/0173994 A1 8/2005 Pfister et al.
2005/0210557 A1 9/2005 Falconer
2005/0221926 A1 10/2005 Naude
2005/0245849 A1 11/2005 Cordo
2005/0251067 A1 * 11/2005 Terry ................................ 601/5
2005/0273022 A1 12/2005 Diaz et al.
2006/0004265 A1 1/2006 Pulkkinen et al.
2006/0069336 A1 * 3/2006 Krebs et al. ..................... 602/28

| | | | |
|---|---|---|---|
| 2006/0132069 | A1 | 6/2006 | Hemphill et al. |
| 2006/0157010 | A1 | 7/2006 | Moriwaki et al. |
| 2006/0206045 | A1 | 9/2006 | Townsend et al. |
| 2006/0249315 | A1 | 11/2006 | Herr et al. |
| 2006/0251179 | A1 | 11/2006 | Ghoshal |
| 2006/0293624 | A1 | 12/2006 | Enzerink et al. |
| 2007/0015611 | A1 | 1/2007 | Noble et al. |
| 2007/0055163 | A1 | 3/2007 | Asada et al. |
| 2007/0155557 | A1 | 7/2007 | Horst et al. |
| 2007/0155558 | A1 | 7/2007 | Horst et al. |
| 2007/0155560 | A1 | 7/2007 | Horst et al. |
| 2007/0155588 | A1 | 7/2007 | Stark et al. |
| 2007/0162152 | A1 | 7/2007 | Herr et al. |
| 2007/0173747 | A1* | 7/2007 | Knotts .............................. 601/5 |
| 2007/0225620 | A1 | 9/2007 | Carignan et al. |
| 2007/0265534 | A1 | 11/2007 | Martikka et al. |
| 2007/0270265 | A1 | 11/2007 | Miller et al. |
| 2007/0287928 | A1 | 12/2007 | Kiviniemi et al. |
| 2008/0039731 | A1 | 2/2008 | McCombie et al. |
| 2008/0097269 | A1 | 4/2008 | Weinberg et al. |
| 2008/0200994 | A1 | 8/2008 | Colgate et al. |
| 2008/0234608 | A1 | 9/2008 | Sankai |
| 2009/0007983 | A1 | 1/2009 | Healy |
| 2009/0036804 | A1 | 2/2009 | Horst |
| 2009/0048686 | A1 | 2/2009 | Ikeuchi et al. |
| 2009/0131839 | A1 | 5/2009 | Yasuhara |
| 2009/0171469 | A1 | 7/2009 | Thorsteinsson et al. |
| 2009/0204038 | A1 | 8/2009 | Smith et al. |
| 2009/0306548 | A1 | 12/2009 | Bhugra et al. |
| 2010/0038983 | A1 | 2/2010 | Bhugra et al. |
| 2010/0039052 | A1 | 2/2010 | Horst et al. |
| 2010/0049102 | A1 | 2/2010 | Yasuhara |
| 2010/0114329 | A1 | 5/2010 | Casler et al. |
| 2010/0234775 | A1 | 9/2010 | Yasuhara et al. |
| 2010/0280628 | A1 | 11/2010 | Sankai |
| 2010/0318006 | A1 | 12/2010 | Horst |
| 2012/0053498 | A1 | 3/2012 | Horst |
| 2012/0095377 | A1 | 4/2012 | Smith et al. |

FOREIGN PATENT DOCUMENTS

| | | | |
|---|---|---|---|
| EP | 1410780 | A1 | 4/2004 |
| JP | 63-136978 | A | 6/1988 |
| JP | 02-275162 | A | 11/1990 |
| JP | 04-104180 | A | 4/1992 |
| JP | 05-260766 | | 10/1993 |
| JP | 06-038551 | A | 2/1994 |
| JP | 07-274540 | A | 10/1995 |
| JP | 08-033360 | A | 2/1996 |
| JP | 08-149858 | | 6/1996 |
| JP | 08-154304 | A | 6/1996 |
| JP | 09-261975 | A | 10/1997 |
| WO | WO 90/11049 | A1 | 10/1990 |
| WO | WO 2005/057054 | A1 | 6/2005 |
| WO | WO 2007/027673 | A2 | 3/2007 |
| WO | WO 2007/041303 | A2 | 4/2007 |

OTHER PUBLICATIONS

Bhugra, Kern; U.S. Appl. No. 12/363,567 entitled "System and method for controlling the joint motion of a user based on a measured physiological property," filed Jan. 30, 2009.

Horst et al., U.S. Appl. No. 12/703,067 entitled "Foot pad device and method of obtaining weight data," filed Feb. 9, 2010.

Advanced Mechatronics Lab (Univ. of Tokyo); Dual Excitation Multiphase Electrostatic Drive (DEMED); http://www.intellect.pe.u-tokyo.ac.jp/research/es_motor/demed_e.html; pp. 1-5; (printed) Nov. 21, 2002.

Advanced Mechatronics Lab (Univ. of Tokyo); High-power electrostatic motor; http://www.intellect.pe.u-tokyo.ac.jp/research/es_motor/es_motor_e.html; pp. 1-2; (printed) Nov. 21, 2002.

Advanced Mechatronics Lab (Univ. of Tokyo); Pulse driven induction electrostatic motor; http://www.intellect.pe.u-tokyo.ac.jp/research/es_motor/pim_e.html; pp. 1-5; (printed) Nov. 21, 2002.

Asel (Univ. of Delaware); Powered orthosis project; http://www.asel.udel.edu/robotics/orthosis/orthosis.html, 1 pg.; (update) Jan. 17, 1999.

British Tech. Group; Demonstration of energy saving in vehicles by integrating an infinitely variable transmission with an optimized petrol engine; prj. No. TR/00087/92; pp. 1-19; (version) Jul. 15, 1998.

Coronel et al; The Coronet effect positively infinitely variable transmission; U.C. Davis; No. 04CVT-51; pp. 1-8; 2004.

Fitch, C. J.; Development of the electrostatic clutch; IBM Journal; pp. 49-56; Jan. 1957.

Frank, Andrew; Engine optimization concepts for CVT-hybrid system to obtain the best performance and fuel efficiency; U.C. Davis; No. 04CVT-56; pp. 1-12; 2004.

Gongola et al.; Design of a PZT-actuated proportional drum brake; IEEE ASME Trans. on Mech.; vol. 4; No. 4; pp. 409-416; Dec. 1999.

Howard Leitch, PPT Ltd.; Waveform Gearing; Motion System Design; pp. 33-35; Nov. 2002.

James et al.; Increasing power density in a full toroidal variator; 3rd Int'l. IIR-Symposium; Innovative Automotive Transmission; pp. 1-11; Dec. 2004.

Kawamoto et al.; Power assist system HAL-3 for GAIT disorder person; ICCHP 2002; LNCS 2398; pp. 196-203; 2002.

Kim et al.; On the energy efficiency of CVT-based mobile robots; Proc. 2000 IEEE; Int. Conf. on Robotics & Automation; pp. 1539-1544; San Francisco, CA; Apr. 2000.

Kluger et al.; An overview of current automatic, manual and continuously variable transmission efficiencies and their projected future improvements; Int. Congress and Expo. (No. 1999-1-1259); pp. 1-6; Detroit, MI; Mar. 1-4, 1999.

Misuraca et al.; Lower limb human enhancer; Int. Mech. Eng. Conf. and Expo.; New York, NY; pp. 1-7; Nov. 11-16, 2001.

Niino et al.; Electrostatic artificial muscle: compact, high-power linear actuators with multiple-layer structures; Proc. IEEE Workshop on Micro Electro Mechanical Systems; Oiso, Japan; pp. 130-135; Jan. 1994.

Nugent, James; Design and performance of an exponential roller gear continuously variable transmission with band clutches; U.C. Davis; No. 04CVT-18; pp. 1-8; 2004.

Ohhashi, Toshio et al.; Human perspiration measurement; Physiological Measurement; vol. 19; pp. 449-461; 1998.

Otto Bock Health Care; (3C100 C-Leg® System) Creating a new standard for prosthetic control; http://www.ottobockus.com/products/op_lower_cleg.asp; pp. 1-2; (printed) Nov. 22, 2002.

Otto Bock Health Care; (3C100 C-Leg® System) New generation leg system revolutionizes lower limb prostheses; http://www.ottobockus.com/products/op_lower_cleg4.asp; pp. 1-2; (printed) Nov. 22, 2002.

Patras et al.; Electro-rheological fluids in the design of clutch systems for robotic applications; IEEE; pp. 554-558; Nov. 11-13, 1992.

Powell et al.; Computer model for a parallel hybrid electric vehicle (PHEV) with CVT; Proc. AACC; pp. 1011-1015; Chicago, IL; Jun. 2000.

Shastri et al.; Comparison of energy consumption and power losses of a conventionally controlled CVT with a servo-hydraulic controlled CVT and with a belt and chain as the torque transmitting element; U.C. Davis; No. 04CVT-55; pp. 1-11; 2004.

Shriner'S Hospitals; Your new orthosis; http://www.shrinershq.org/patientedu/orthosis.html; pp. 1-3; (printed) Nov. 22, 2002.

Takaki et al; Load-sensitive continuously variable transmission for powerful and inexpensive robot hands; IEEE; pp. 45-46; 2004.

Takesue et al.; Development and experiments of actuator using MR fluid; IEEE; pp. 1838-1843; 2000.

Townsend Design; Functional Bracing Solutions (AIR Townsend & Ultra AIR); http://www.townsenddesign.com/air.html; 2 pgs; (printed) Nov. 21, 2002.

Townsend Design; Functional Knee Bracing Solutions; http://www.townsenddesign.com/functional.html; pp. 1; (printed) Nov. 21, 2002.

Townsend Design; Patented Motion Hinge (Planes of Motion); http://www.townsenddesign.com/motion.html; pp. 1; (printed) Nov. 21, 2002.

Trimmer et al.; An operational harmonic electrostatic motor; IEEE; pp. 13-16; 1989.

International Search Report, PCT/US2008/053934. (Jun. 24, 2008).

* cited by examiner

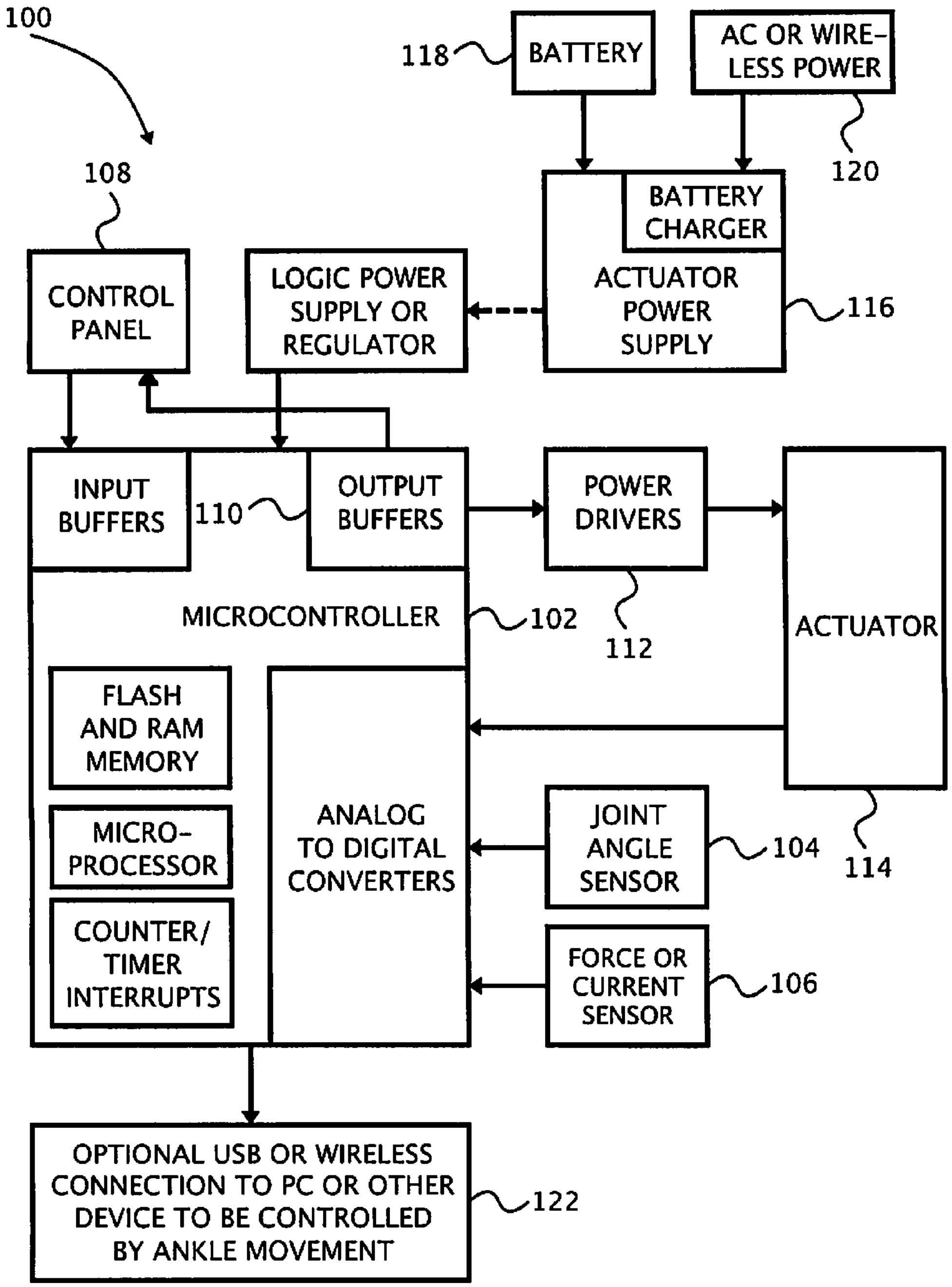
FIG. 1 BLOCK DIAGRAM

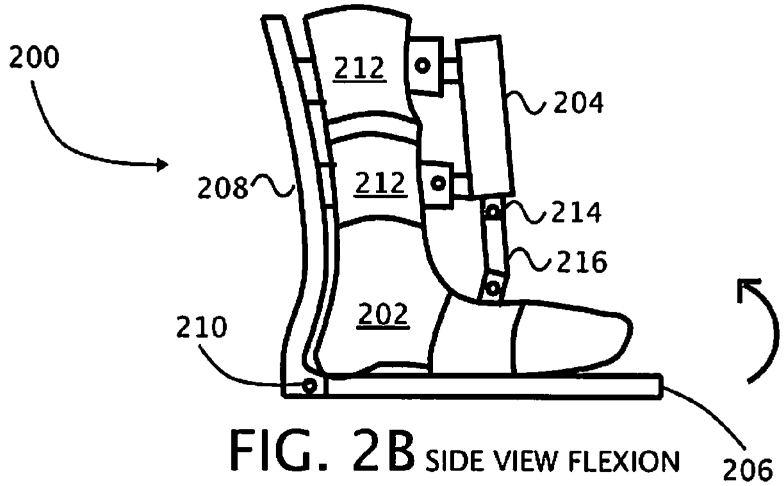
FIG. 2B SIDE VIEW FLEXION
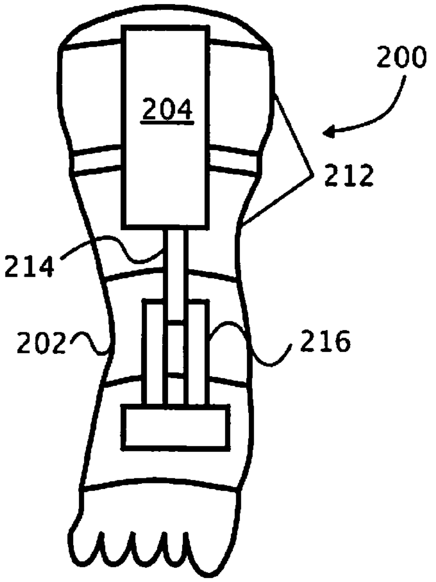
FIG. 2A FRONT VIEW
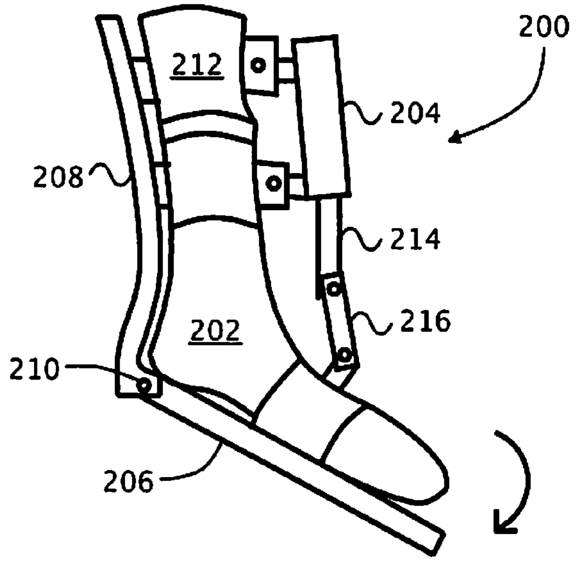
FIG. 2C SIDE VIEW EXTENSION

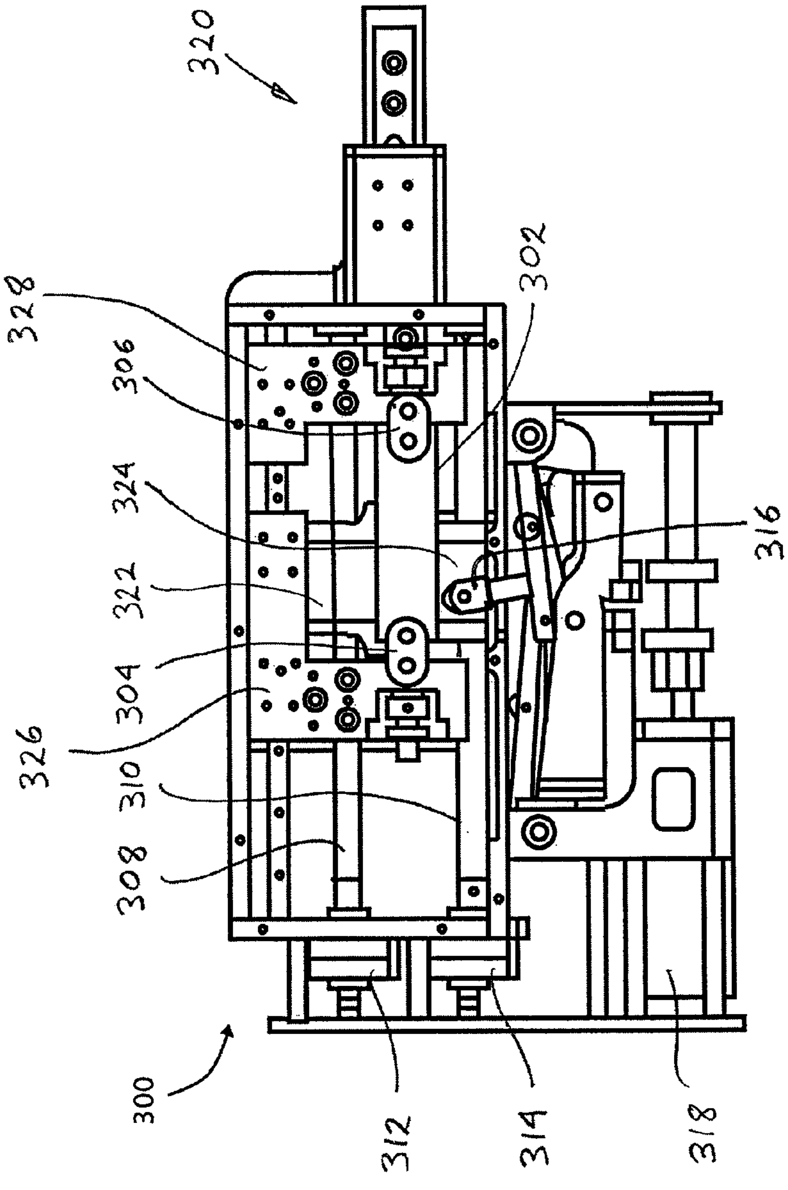
FIG. 3 Continuously Variable Actuator

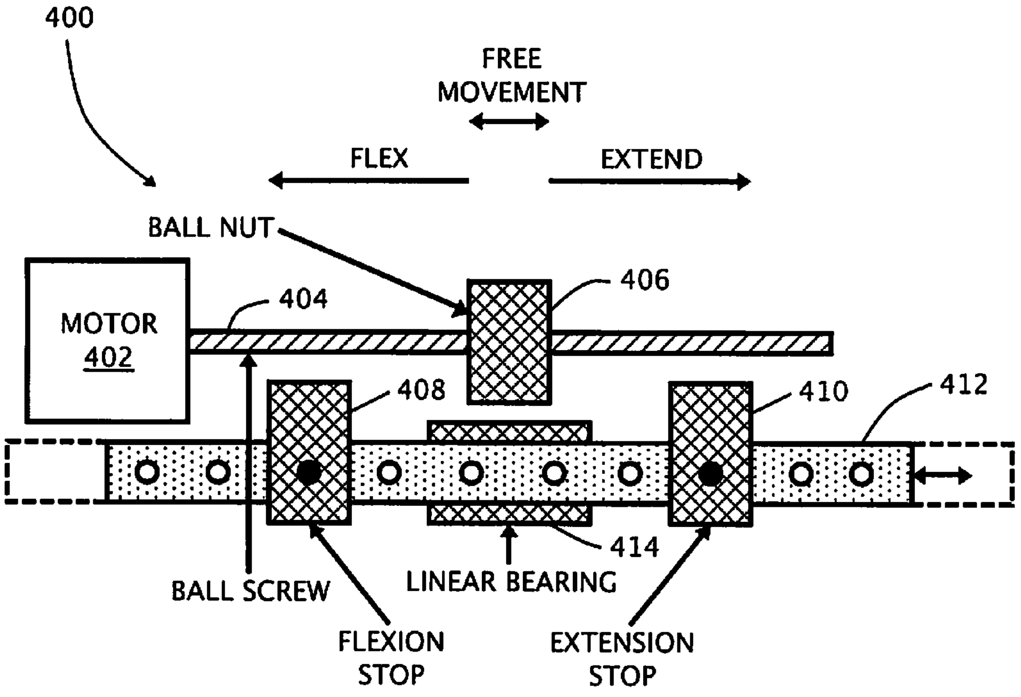
FIG. 4 SINGLE MOTOR ACTUATOR

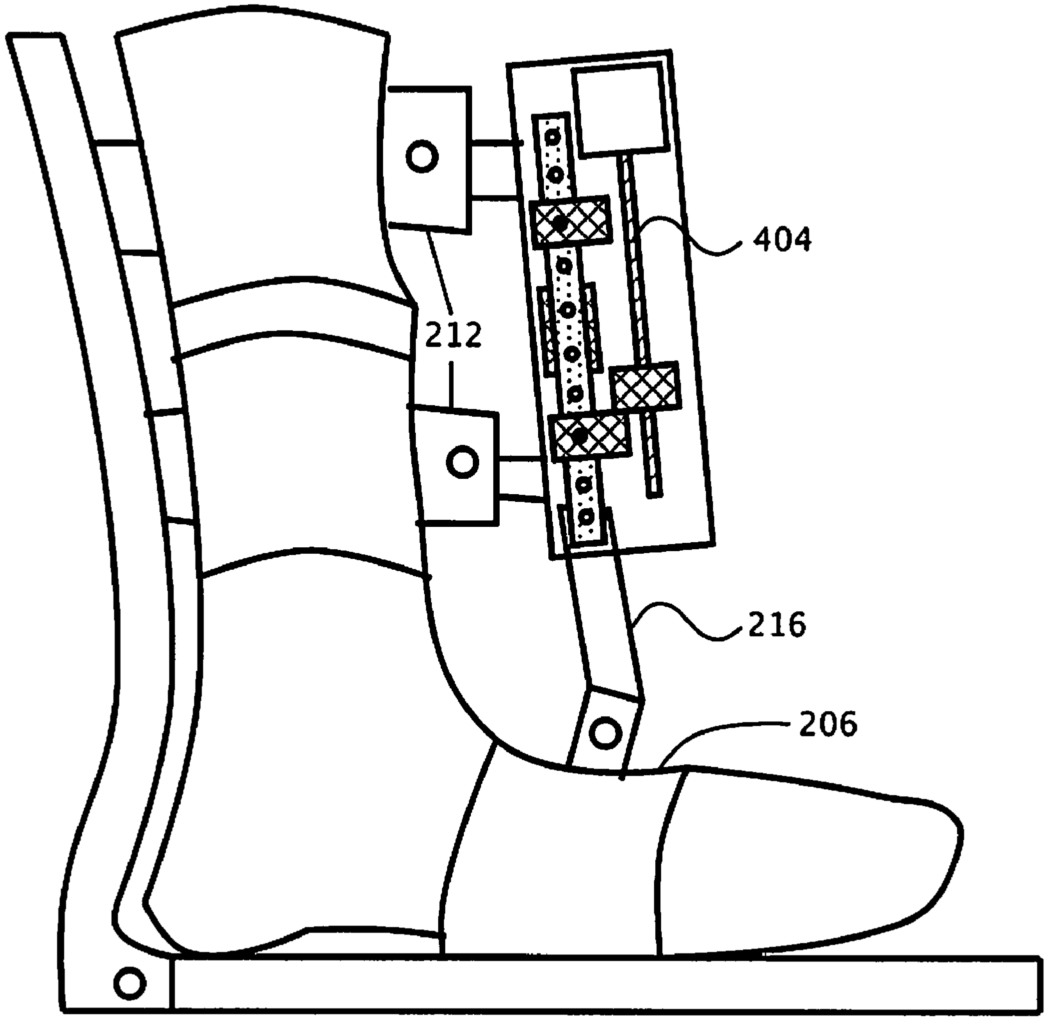
FIG. 5 ACTUATOR AND ANKLE ATTACHMENT

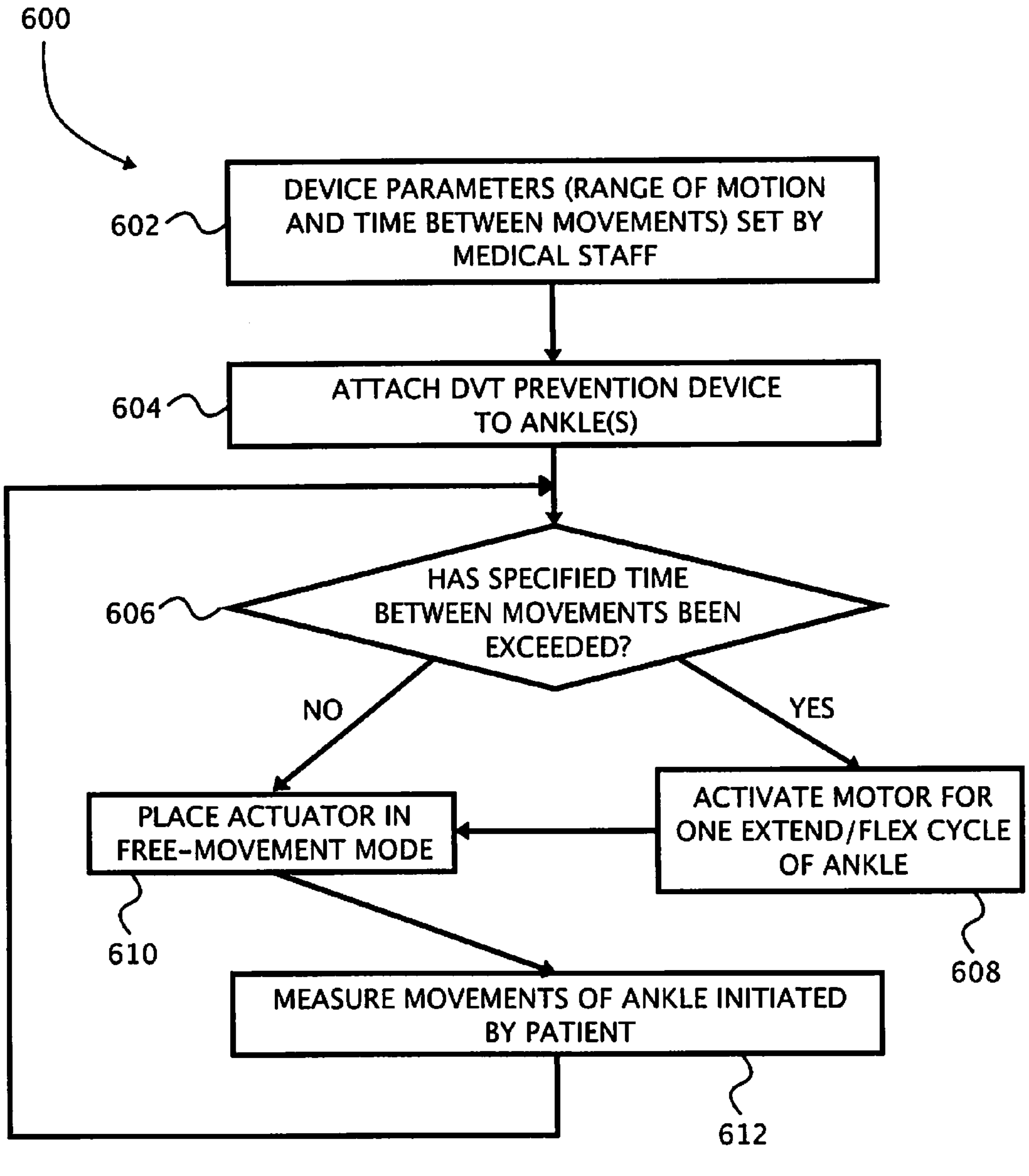
FIG. 6 FLOWCHART OF DVT PREVENTION ALGORITHM

METHOD AND DEVICES FOR MOVING A BODY JOINT

CLAIM OF PRIORITY

This application claims priority to U.S. Provisional Patent Application No. 60/901,614 entitled "Deep Vein Thrombosis Prevention Device", which was filed on Feb. 14, 2007, the contents of which are expressly incorporated by reference herein.

BACKGROUND OF THE INVENTION

Deep Vein Thrombosis (DVT) is the formation of a thrombus (clot) in a deep vein in a leg. The clot can block blood flow in the leg, or the clot may travel to the lungs causing a potentially fatal pulmonary embolism. The incidence of DVT is particularly high after hip or knee surgery, but may occur whenever patients are immobilized over a period of time. DVT occurrence is known to be high after lower extremity paralysis due to stroke or injury and is also a risk factor in pregnancy, obesity, and other conditions.

Current techniques for avoiding DVT have drawbacks. For example, blood thinning drugs have side effects, elastic stockings and compression devices have limited effectiveness, while compression and exercise devices have limited patient compliance. Active or passive movement of the ankle, alone or in combination with other DVT avoidance techniques, can reduce the incidence of DVT; however there has been no device to assure adequate movement that is acceptable to hospital patients and staff.

SUMMARY OF THE INVENTION

The present invention teaches a variety of methods, techniques and devices for preventing deep vein thrombosis (DVT). According to one embodiment, a DVT prevention device is attached to a patient's ankle, or any portion of any limb, to deliver active or passive movement to promote blood flow in the lower extremities. According to certain aspects, the DVT prevention device includes a battery or AC-powered actuator, an embedded computer, a software control system, sensors, and a coupling to the ankle and the foot.

According to another embodiment, a DVT prevention device operates in one or more modes to supply 1) passive extension and flexion of the ankle, 2) active extension and flexion of the ankle, and 3) free movement of the ankle. Patient compliance may be enhanced by allowing the patient to determine the preferred mode of operation; the device assures adequate total movement over a period of time by supplying passive movement when necessary. For example, the patient may perform enough movements in free-movement mode to delay future activations of the device, or the patient may actively resist the movement to exercise the calf muscles and promote enhanced blood flow beyond that of passive movement.

According to yet another aspect of the present invention, the present invention may include an output connection to allow the patient's extension and flexion of the ankle to serve as a human interface device similar to a computer mouse. If coupled to a web browser or computer game, the device can serve the dual role of preventing DVT and helping the patient to pass time more quickly. Such a device can also serve as the primary input device to those with arm or hand disabilities and may tend to avoid or mitigate carpal tunnel syndrome.

BRIEF DESCRIPTION OF THE DRAWINGS

FIG. 1 is a block diagram of electronics and an embedded computer that controls a deep vein THROMBOSIS (DVT) prevention device according to an embodiment of the present invention.

FIG. 2*a* shows a front view of a DVT prevention device attached to the leg of a patient according to an embodiment of the present invention.

FIG. 2*b* shows a side view of the DVT prevention device of FIG. 2*a* near the flexion limit.

FIG. 2*c* shows a side view of the DVT prevention device near the extension limit.

FIG. 3. shows a continuously variable actuator according to another aspect of the present invention that may be used to construct a DVT prevention device FIG. 4. shows a single-motor actuator with a free movement mode according to another embodiment of the present invention.

FIG. 5. shows a single-motor actuator as attached to an ankle according to a further embodiment of the present invention.

FIG. 6. is a flowchart of a method for the prevention of DVT according to one aspect of the present invention.

DESCRIPTION OF THE PREFERRED EMBODIMENTS

FIG. 1 shows a block diagram of a deep vein THROMBOSIS (DVT) prevention device 100 according to an embodiment of the present invention. An embedded microcontroller 102 is programmed to accept input from one or more sensors such as joint angle sensor 104 and a force (e.g., current) sensor 106. The embedded microcontroller 102 may also be coupled to a control panel 108. The control panel 108 may be for use by a patient, a doctor, or other health care provider. The embedded microcontroller 102 is operable to produce outputs for power drivers 112 to control the motion of one or more actuators 114.

With further reference to FIG. 1, power is supplied to the DVT prevention device 100 through an actuator power supply 116. Power may come through a battery 118 or from an AC adapter 120. In one embodiment, the battery 118 is wirelessly recharged by inductive coupling to a pad conveniently placed, such as at the foot of a hospital bed. Such a wireless recharge device has been announced by Wildcharge at the 2007 Consumer Electronics show.

In certain embodiments, such as cases where the patient can supply significant force to exercise the ankle, the battery charging requirements may be reduced or eliminated by recharging the battery from energy captured from running the actuator 114 as backdriven motor generator. This may provide an extra incentive to the patient to exercise, especially if the amount of exercise is recorded and presented to the patient, the patient's family and the hospital staff.

The control panel 108 may be as simple as an on/off switch, or may include switches and displays to allow adjustments for the range of motion, minimum repetition frequency, movement statistics, battery charge, and the like.

One embodiment includes a USB or wireless connection 122 to allow the DVT prevention device 100, or a pair of devices (e.g., one device each on the left and right ankles), to act as a human interface device (HID) that may be connected, for instance, to a PC. For example, the right ankle position may determine the left/right location of a computer curser and the left ankle position may determine the up/down location of the curser. When a patient uses the computer, for instance to surf the internet or play a game, the ankles must be flexed and extended, and in the process the blood flow to the leg is enhanced. The computer connection may significantly enhance patient compliance, which is a major problem with existing compression devices.

FIG. 2 shows three views of a DVT prevention device 200, according to another embodiment of the present invention, attached to an ankle 202. An actuator 204 is attached to upper and lower ankle attachment points such that activation of the actuator 204 may extend or flex the ankle 202. FIG. 2*a* shows a front view of the DVT prevention device 200, FIG. 2*b* shows a side view of the DVT prevention device 200 near a flexion limit, and FIG. 2*c* shows a side view of the DVT prevention device 200 near an extension limit. The limits may be programmatically or physically limited within the patient's range of motion. As will be appreciated, a typical extension limit (also known as Planar Flexion) is about 45 degrees from the standing position of the ankle, and a typical flexion limit (also known as Doral Flexion) is about −20 degrees from the standing position.

With further reference to FIG. 2, a rigid foot support structure 206 is placed under the foot and a rigid ankle support 208 structure is placed behind the calf. The two support structures 206 and 208 are connected to each other with a hinge 210. The actuator 204 is mounted to the upper rigid structure 208. Straps or padded supports 212 hold the ankle support structure 208 and actuator 204 to the lower leg. An output shaft 214 of the actuator 204 is connected to a linkage 216 attached to the foot support structure 206. One or more straps 212 hold the foot support structure 206 to the foot.

FIG. 3 shows a continuously variable actuator 300 suitable for use as an actuator according to certain embodiments of the present invention. One suitable example of the continuously variable actuator is described in more detail in the Horst et al.'s U.S. patent application Ser. No. 11/649,493, filed Jan. 3, 2007, the contents of which are incorporated herein by reference. The actuator 300 uses a flexible belt 302 connected by belt supports 304 and 306, two motor-driven lead screws 308 and 310 driven by motors 312 and 314, respectively, and a motor driven cam 316 driven by motor 318 to provide variable drive ratio forces in either direction or to allow the output shaft 320 to move in a free-movement mode. Also shown are two driven carriages 322 and 324, and two passive carriages 326 and 328.

FIG. 4 shows a single-motor actuator 400 suitable for use as an actuator according to another embodiment the present invention. In the single-motor actuator 400, a motor 402, which may have an internal gear head, drives a lead screw 404 to move a nut 406 linearly. The lead screw 404 may be an acme screw, a ball screw with a ball nut for lower friction and higher motor efficiency, or any other suitable screw. The ball nut 406 is always between a flexion stop 408 and an extension stop 410 connected to an output shaft 412. When the ball nut 406 is in a center of travel, the output shaft 412 is free to move linearly in either direction without having movement impeded by interaction with the ball nut 406. This position provides free movement of the output shaft 412, and likewise free movement of the ankle or other relevant body part, even with no power applied to the actuator 400. When it is time to extend or flex the ankle, the ball screw 404 is turned to move the ball nut 406 to the left or the right where the ball nut 406 eventually pushes against the flexion or extension stop. Further movement of the ball nut 406 in the same direction moves the flexion stop 408 or the extension stop 410, and hence moves the output shaft 412, thus causing the ankle to flex or extend, respectively. The output shaft 412 is supported by one or more linear bearings 414 allowing the output shaft 412 to move freely in one dimension while preventing substantial movement or twisting in other dimensions.

To further elaborate, lead screws include types of screws such as acme screws and ball screws. Ball screws have nuts with recirculating ball bearings allowing them to be back-driven more easily than acme screws. When using a ball screw, motion of the nut causes the lead screw and hence the motor to rotate. Therefore, when the ball nut is engaged by one of the stops, the patient may exercise the leg muscles by extending or flexing the foot to cause motion of the output shaft and hence cause motion of the motor. Exercise may be accomplished either by resisting the passive motions imparted by the actuator, or through a separate exercise mode where all motion is caused by the patient. In either case, software running in the embedded processor controls the amount of current delivered to/from the motor and therefore the amount of exercise resistance.

FIG. 5 shows the single motor actuator 400 of FIG. 4 attached to an ankle support 212 and coupled to a foot support 206 through a linkage 216. The ball screw 404 in the actuator 400 is shown in a position about to extend the ankle by pushing to the right. Near the extension and flexion limits, some compliance may be built in to provide more comfort to the patient and to assure that there is no possibility of injuring the patent. This may be accomplished by springs in the actuator 400 or springs in the linkage 216, or both (not shown), that expand or compress before damaging forces are applied.

To further elaborate, a free-movement mode of the actuator 400 allows the patient to move the ankle with little resistance. The free movement mode obviates the need to remove the DVT prevention device when walking (for instance, to the restroom); this improves patient compliance because there is no need for the patient or hospital staff to remove and reattach the DVT protection device frequently.

FIG. 6 is a flowchart of a method for operating a device in the prevention of DVT according to one embodiment of the present invention. In step 602, a person such as a medical professional sets up the device with appropriate limits for range of motion and minimum time between ankle movements. This step 602 may also be performed automatically. Then, in step 604, a DVT prevention device is attached to one or both ankles of the patient, and if necessary the device is turned on. In step 606, a test is made to determine if too much time has elapsed since the last flexion of the ankle. If the predefined time limit between flexion has been exceeded, step 608 runs a device actuator through one flexion/extension cycle or other suitable sequence. This cycle may be purely passive motion, or the patient may actively resist tending to cause more blood flow. If the time limit has not been exceeded or if the cycle is at the end of the passive or active movement cycle, the actuator is put into free movement mode in step 610. Finally, in step 612, the movements of the ankle are monitored to help determine the appropriate time for the next movement. Step 612 is followed by step 606, repeating the sequence until the prevention method stops, the device is removed, or the device is turned off.

In the flowchart of FIG. 6, step 606 determines if the specified time has elapsed in order to initiate movement of the ankle. The "specified time" can be determined by any suitable manner including one or more of any of the following ways:

1. A fixed elapsed time since the last ankle movement
2. A moving average over time of the frequency of ankle movements.
3. A dynamic algorithm that approximates blood flow in the leg by taking into account the frequency of movement, the intensity of active movement, and the patients age and condition.

A fixed time algorithm is simplest to implement, but may move the ankle more than necessary. Using a frequency of movement algorithm, the patient can have more control and has more positive feedback for initiating movements beyond the minimum. A dynamic algorithm rewards patient-initiated exercise (resisting the passive movement) and also customizes the frequency of movement based on the patient's condition. The algorithm can be determined through clinical studies of different patients using the device while monitoring blood flow.

The invention is not limited to the specific embodiments described. For example, actuators need only have a way to move and allow free movement of the ankle and need not have strictly linear movement. The actuator may be driven from a brushed or brushless motor or may be activated through pneumatics, hydraulics, piezoelectric activation, electro-active polymers or other artificial muscle technology. The usage of the device is not confined to hospitals but also may be beneficial to those bedridden in nursing homes or at home. The device may also be beneficial to avoid DVT for those traveling long distances by airplane, automobile or train.

We claim:

1. An actuator system providing substantially free movement or force to an output member comprising:

a motor driving a lead screw;

a nut driven by the lead screw;

an output member with at least one extension stop and at least one flexion stop;

a first attachment configured to couple the actuator system to a first portion of a patient; and a second attachment configured to couple the output member to a second portion of the patient, wherein the first and the second portions of the patient are on opposite sides of a body joint capable of flexion and extension, and wherein the nut driven by the lead screw is configured to be moved to a first position located between the at least one extension stop and the at least one flexion stop allowing substantially free movement of the output member such that the patient can move the body joint in a first direction with little resistance when the first and the second attachments are coupled to the first and the second portions of the patient, and a second position in which the nut engages the at least one extension stop and causes the output member and the body joint to move in the first direction.

2. The actuator system of claim 1 wherein the flexion stop is attached to the output member and wherein the nut engages the flexion stop in a third position and causes the output member to move in a second direction opposite the first direction.

3. The actuator system of claim 1, wherein the first and the second attachments are pivotably coupled together.

4. The actuator system of claim 1, configured such that when the nut driven by the lead screw is moved to the second position to cause the output member to move in the first direction, the body joint is moved by the actuator system in an extension direction.

5. The actuator system of claim 1, further comprising:

a portable power supply; and an embedded controller powered by the portable power supply and configured to control the motor.

6. The actuator system of claim 5, further comprising:

a joint angle sensor operably coupled to the controller.

7. The actuator system of claim 5, further comprising:

a force sensor operably coupled to the controller.

8. The actuator system of claim 5, further comprising:

a connection port to communicate patient movement.

9. The actuator system of claim 1, wherein the substantially free movement of the output member is configured to be in an extension direction or a flexion direction.

* * * * *